(12) United States Patent
Chan et al.

(10) Patent No.: US 6,600,821 B1
(45) Date of Patent: Jul. 29, 2003

(54) SYSTEM AND METHOD FOR AUTOMATICALLY DETECTING PROBLEMATIC CALLS

(75) Inventors: Michael Chan, Los Angeles, CA (US); Patrick Donohue, Los Altos, CA (US); Serdar Uckun, Palo Alto, CA (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/426,615

(22) Filed: Oct. 26, 1999

(51) Int. Cl.[7] ................................................ H04M 1/64

(52) U.S. Cl. .............................. 379/265.07; 379/88.02; 379/88.19

(58) Field of Search ........................ 379/265.07, 265.03, 379/265.06, 265.02

(56) References Cited

U.S. PATENT DOCUMENTS

| | | | | |
|---|---|---|---|---|
| 5,696,811 A | * | 12/1997 | Maloney et al. | ............. 379/111 |
| 5,737,405 A | * | 4/1998 | Dezonno | ..................... 379/189 |
| 5,818,907 A | | 10/1998 | Maloney et al. | ............... 379/34 |
| 5,818,909 A | | 10/1998 | Van Berkum et al. | ......... 379/80 |
| 6,064,731 A | * | 5/2000 | Flockhart et al. | ....... 379/265.06 |
| 6,198,739 B1 | * | 3/2001 | Neyman et al. | ............. 370/353 |
| 6,363,145 B1 | * | 3/2002 | Shaffer et al. | ......... 379/265.02 |

* cited by examiner

Primary Examiner—Fan Tsang
Assistant Examiner—Olisa Anwah (57) ABSTRACT

A system and method for detecting problematic call interactions between callers and call center agents of a communications system. By monitoring call associated information, speech, and voice characteristics of the call interaction, the system and method determine whether calls are being handled properly. If a call is determined to be problematic, a call center supervisor is automatically notified of the problematic call. Further, the problematic call interaction is recorded and can later be retrieved.

67 Claims, 5 Drawing Sheets

SYSTEM AND METHOD FOR AUTOMATICALLY DETECTING PROBLEMATIC CALLS

FIELD OF THE INVENTION

This invention relates to communications systems and, more particularly, to call centers with agents servicing customer telephone calls.

BACKGROUND OF THE INVENTION

Communications systems with call centers are known. Such systems are typically used as a means of distributing telephone calls among a group of call center agents of an organization. As calls are directed to the organization from the public switch telephone network (PSTN), the communications system directs the calls to its call center agents based upon some algorithm. For example, a communications system such as an automatic call distributor (ACD), a public branch exchange (PBX), or a central office exchange service (centrex) may recognize a call target based upon an identity of an incoming trunk line and route the call accordingly.

In systems associated with service organizations, where many calls are received and handled by many call center agents, it may be important for a call center agent to have ready access to customer files. In such a situation, a database is maintained of existing customers. Customer records may be displayed on call center agent terminals as the call center agent converses with specific customers. The communications system may transfer an identifier of the customer to the database based upon an automatic number identification (ANI) facility, operating from within the PSTN. A host computer, in turn, displays the customer records via a computer terminal of the selected call center agent at the time the call is delivered.

Once a connection is made, call center agents are responsible for servicing customers. Call center agents may provide product support, take sales orders, and handle inquires. In essence, the call center agents provide the wide array of services that the companies that use them require. Thus, the effectiveness and efficiency of a call center depends on the performance of the call center agents. Call center supervisors manage call center agents and are responsible for monitoring their performance. Call center supervisors, primarily, monitor call center agents to assure the quality of customer service.

Currently, monitoring by a call center supervisor of call interactions between customers and call center agents is performed either in real time or by recording selected conversations on tape and reviewing them at a later time. In communications systems, there typically exist features that are integral to the system and that enable monitoring of call center agent performance. These capabilities are generally manual and have significant limitations. For example, if a call center supervisor decides to listen to call center agent A while call center agent B is having trouble handling a customer, then the call center supervisor has chosen the wrong call interaction to listen to. By monitoring calls randomly, the call center supervisor may not hear many of the troublesome call interactions. Further, another manual method of monitoring occurs when a call center agent requests the call center supervisor to monitor a call. This manual method of monitoring may be useful when the customer is known to be difficult, but may not be useful if the call center agent is partly responsible for the troublesome interaction. For instance, if the call center agent causes a customer to become irate, the agent most likely will not let the call center supervisor know about the troublesome call interaction. By missing such call interactions and not being able to remedy such situations, customers may become disappointed and upset with the level of service provided by the company.

The existing method of detecting difficult calls of communications systems requires the supervisor to randomly select call interactions to monitor. As a consequence, many troublesome calls may go undetected, and thereby, the quality of service provided by agents may degrade. Accordingly, a need exists for a better method of detecting troublesome call interactions of a communications system with a call center.

SUMMARY

The present invention, accordingly, provides a system and method for automatically detecting problematic calls that overcomes or reduces the disadvantageous and limitations associated with prior agent monitoring methods and systems.

Illustrated embodiments reduce the disadvantage of randomly selecting call interactions for monitoring by providing a system and method of detecting problematic call interactions of a communications system. By monitoring call associated information, speech, and voice characteristics of the call interaction, the likelihood of detecting problematic call interactions is increased.

BRIEF DESCRIPTION OF THE DRAWINGS

The foregoing advantageous features of the invention will be explained in greater detail and others will be made apparent from the detailed description of the preferred embodiment of the present invention which is given with reference to the several figures of the drawing, in which.

DETAILED DESCRIPTION

Figure 1:
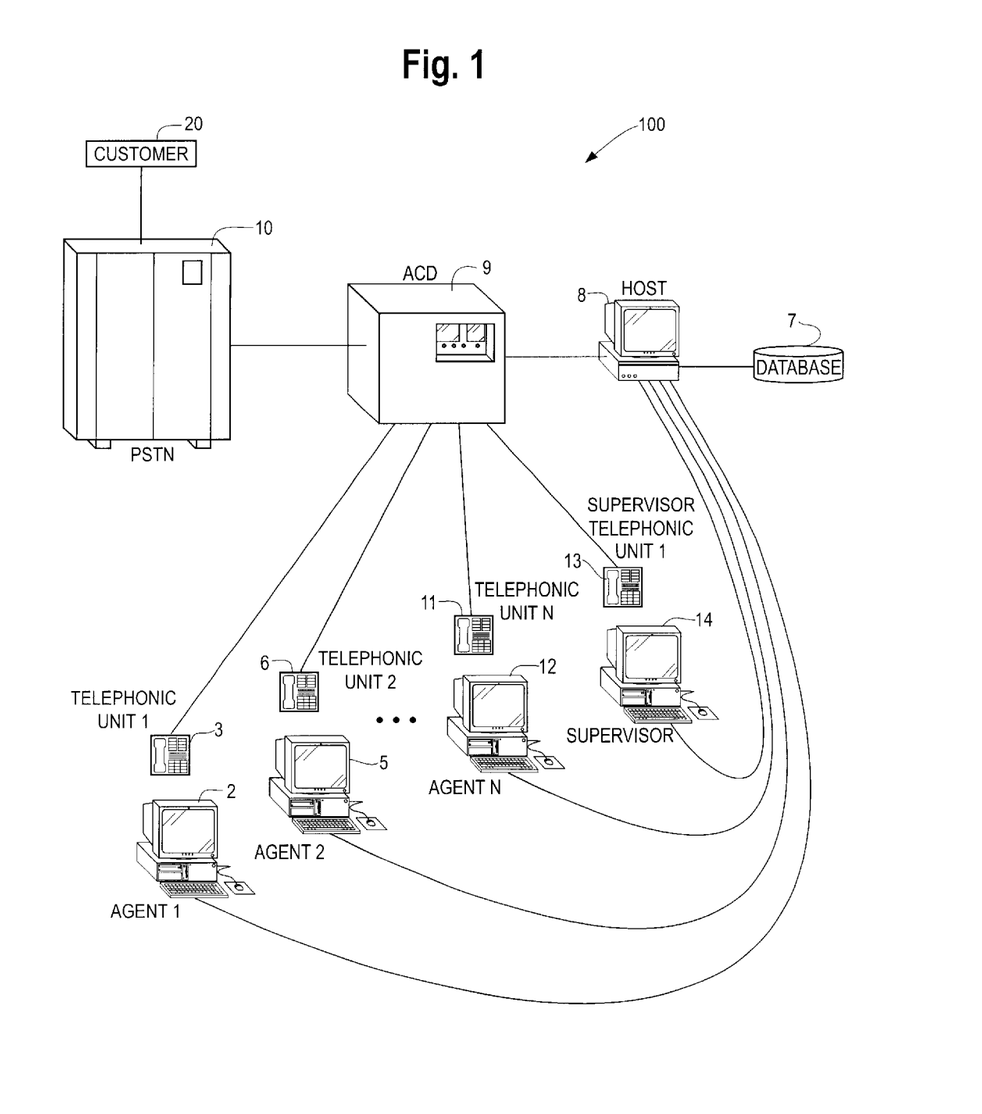
FIG. 1 is a simplified functional block diagram of the automatic call distribution system in accordance with an illustrated embodiment of the invention.

Shown in FIG. 1 is a communications system 100 shown in a context of use. The communications system 100 functions to selectively and automatically interconnect a caller 20 calling through the public switched telephone network (PSTN) 10 to one of a number of agent telephones 1–N (3, 6, or 11) where N may be a preselected number greater than one. Although the communications system 100 is described with reference to an automatic call distributor (ACD), a PBX or centrex system may also be used in place of the ACD. Further, implementing a call center with any of these switching systems is considered to be equivalent and variations will not further be discussed. For a more detailed discussion of automatic call distributors, reference may be made to U.S. Pat. No. 5,268,903 to Jones et al. entitled "Multichannel Telephonic Switching Network With Different Signaling Formats and Connect/PBX Treatment Selectable For Each Channel", issued Dec. 7, 1993; U.S. Pat. No. 5,140,611 to Jones et al. entitled "Pulse Modulated Self-Clocking and Self-Synchronizing Data Transmission and Method for a Telephonic Communication Switching System", issued Aug. 8, 1992 and U.S. Pat. No. 5,127,004 to Lenihan et al. entitled "Tone and Announcement Message Code Generator for a Telephonic Switching System and Method", issued Jun. 30, 1992.

Further, although the present invention is described in reference to the PSTN 10, a packet-switched voice network or other equivalent network where voice calls are relayed to a call center may be used. For example, where voice calls are transmitted over a global network, such as the Internet using Internet Protocol (IP) a packet-switched communications network implements the system of transmitting the call.

In addition to the agent telephone (3, 6, or 11), the agent has a computer consisting of a terminal and an input device, such as a keyboard or mouse. Additionally, the agent may wear a headset which provides audio communications between the agent and the caller. The headset may be connected to the caller through the agent's telephone (3, 6, or 11) and the ACD 9. The headset may also be connected to the caller (using voice over IP) through the agents terminal (2, 5, or 12), the host 8 and the Internet. The headset typically includes a microphone and one or more speakers. Accordingly, the voice of the caller is heard by the agent through the headset and may be recorded by a record device in the agent terminal (2, 5, or 12) or by a host computer 8.

In addition to the agent telephones (3, 6, 11), the ACD 9 also interfaces with a host computer 8. The host 8 functions to provide agent workstations (2, 5, 12) with information from the ACD 9 and a database 7. For example, as calls are received from the PSTN 10, call associated information (e.g., ANI, DNIS, etc.) may be delivered to the workstation (2, 5, or 12) along with the call. Where ANI information is delivered along with the call, the workstation (2, 5, or 12) may use the ANI information as a file identifier to retrieve customer information from the database 7. In the example of voice over IP, call associated information may include the customer's email address.

In accordance with an embodiment of the present invention, a method for automatically detecting problematic calls by an ACD is provided comprising the steps of: (a) monitoring calls for problematic call attributes, and (b) notifying a supervisor when a call is determined to be problematic. Problematic may mean a call interaction which is difficult or complex, a customer who is difficult to deal with, or a situation which is perplexing. As an example, in a retail sales organization, a problematic call may be one in which the agent has difficulty in concluding a sale or one in which an argument takes place between the agent and customer. In an emergency response center, a problematic call may be one in which the agent does not properly provide emergency information to the caller or one in which the agent and caller exchange obscene words.

The step of monitoring calls for problematic call attributes functions to provide a prediction of call interactions which may be problematic. The step of notifying a supervisor when a call is determined to be problematic functions to alert an individual who may be able to assess the situation and, if problematic, may be able to remedy it. If the monitoring system detects a problematic call, the supervisor is automatically notified of the call. Further, additional information relating to the telephone call, such as length of the call, the time of the call and the like, may be downloaded to the supervisor terminal 14.

Under an illustrated embodiment, calls determined to be problematic may be recorded and may be later retrieved. The host 8 may record call interactions and send data about those calls determined to be problematic to the database 7. Then, the database 7 stores recorded call interactions. The supervisor may want to retrieve the recorded calls at a later date to analyze the weaknesses of the call handling approach used by the call center agent and to determine where further training of the agent may be necessary.

Figure 2:
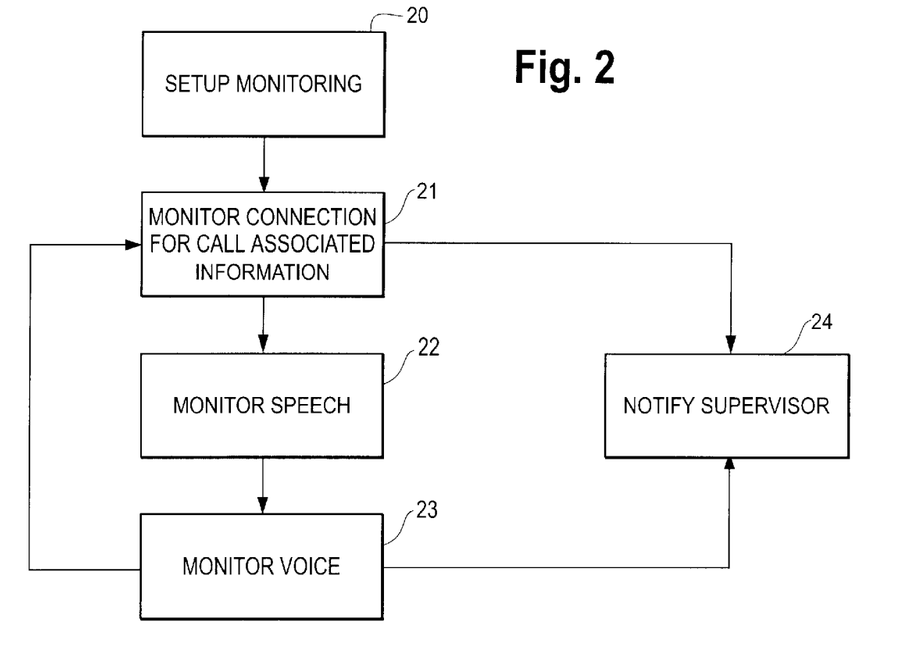
FIG. 2 is a simplified flow chart of the problematic call detection method used by the system of FIG. 1.

Referring now to FIG. 2, in an illustrated embodiment of the present invention, the step of monitoring calls for call attributes regarded as problematic may include (a) setting up the monitoring process (see block 20), (b) monitoring the-connection for call associated information (see block 21), (c) monitoring speech (see block 22), (d) monitoring voice attributes (see block 23) and (e) notifying the supervisor (see block 24).

Figure 3:
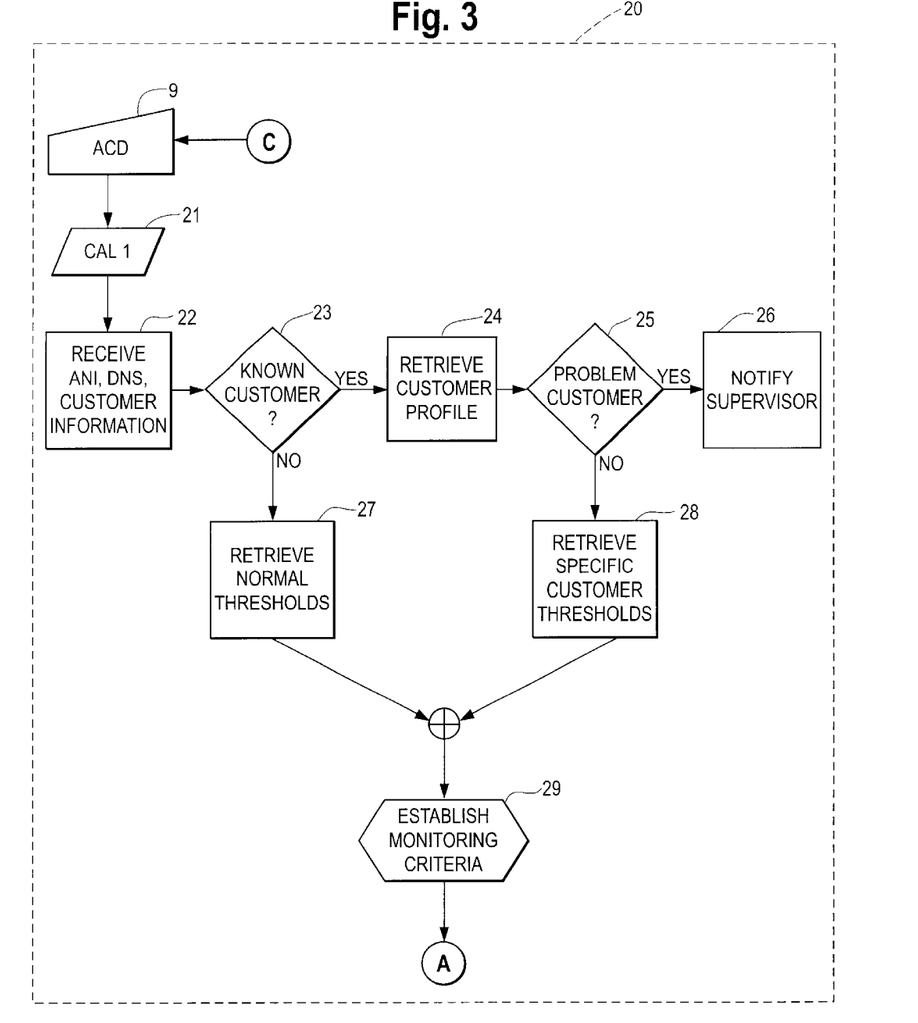
FIG. 3 is a simplified flow chart of the setup monitoring block 20 of the problematic call detection method of FIG. 2.

Referring now to FIG. 3, as a call session begins, call associated information may be used to determine the monitoring criteria to apply to the call. Initially, a call is delivered to the agent telephone (3, 6, or 11) or to the agent terminal (2, 5, or 12) (see block 21). Where an ANI, DNS, or other customer information is delivered along with the call (see block 22), such information may be used to determine the monitoring criteria for the call. Similarly, where the call arrives as voice over IP, the IP address of the caller may be used to determine the monitoring criteria, as may a list of items that are already in a shopping basket of the caller. If the customer is a known customer (see block 23), then the previously stored customer profile may be loaded from the database 7 into the host 8 (see block 24). Otherwise, a profile of normal thresholds may be used for monitoring (see block 27). Further, if the information in the customer profile identifies the customer as difficult (i.e. potentially problematic) (see block 25), then the call may be delivered to a supervisor (see block 26). Otherwise, if the customer is not known to be problematic, then the customer profile is used for monitoring (see block 28). Thus, the monitoring criteria will either be a specific customer profile or a normal profile (see block 29).

Figure 4:
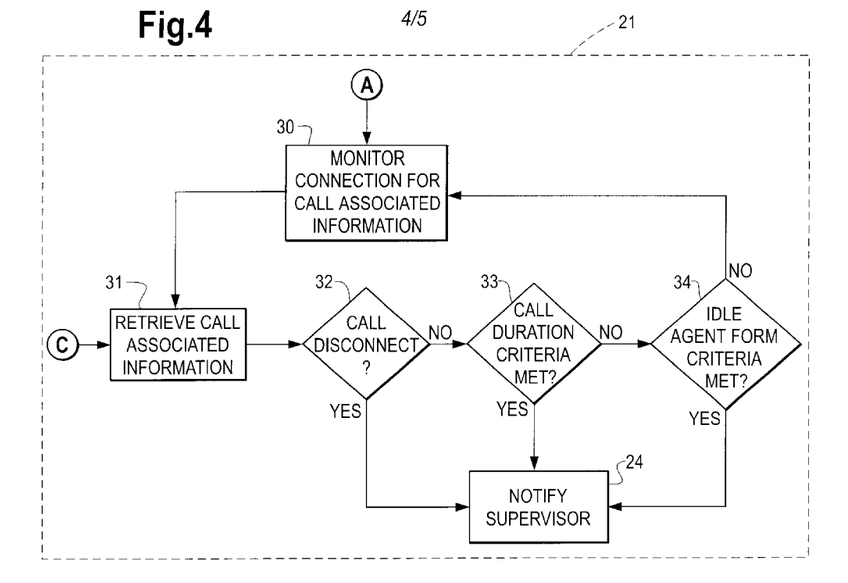
FIG. 4 is a simplified flow chart of the monitor connection for call associated information block 21 of the problematic call detection method of FIG. 2.

Referring now to FIG. 4, during the call, the call connection is monitored for call associated information that may signal that the call is problematic (see block 30). For example, if a call disconnect (see block 32) occurs (i.e. initiated by the agent) after the call has been of a long duration (see block 33) or if during a sales presentation, the agent enters an order form application but does not conclude a sale (see block 34).

Figure 5:
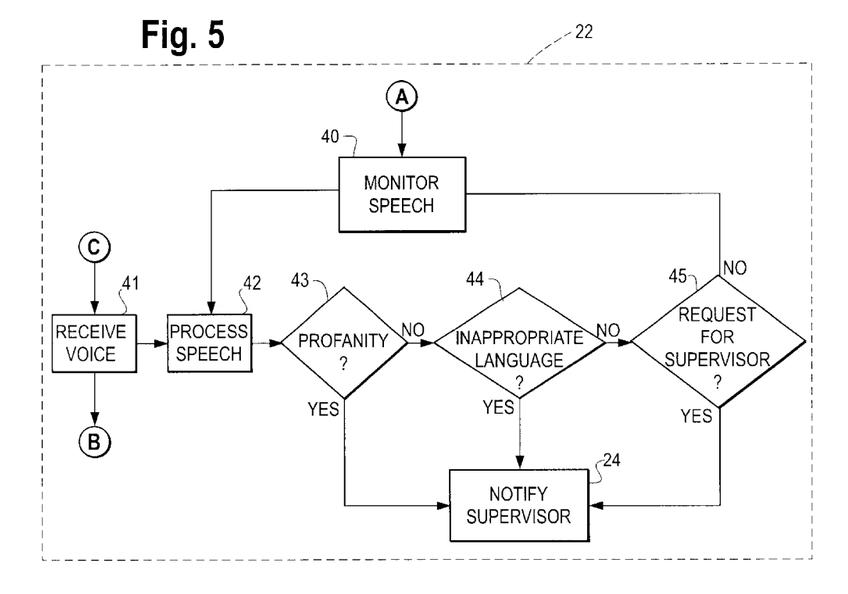
FIG. 5 is a simplified flow chart of the monitor speech block 22 of the problematic call detection method of FIG. 2.

Referring now to FIG. 5, as the call progresses, monitoring continues by processing speech associated with the call. Voice is received from the ACD 9 or other communications system (see block 41) (e.g. via a three-party connection) and processed for speech attributes (see block 42). The processed speech is searched for indications of the use of profanity (see block 43), inappropriate language (see block 44) or use of the word "supervisor" (see block 45). Inappropriate language comprises stored parameters that includes words such as "hate," "kill," and "honey." Further, if profanity or inappropriate language is found in the processed speech, then the monitoring profile is searched to determine whether the speech is normal for the customer. If it is not, then the call is delivered to the supervisor (see block 24). For example, a customer from a Southwestern state may address the agent using the word "sugar" which typically may be considered inappropriate language, but after comparing the language to the criteria in the monitoring profile may be considered to be normal for the customer. Thus, the call would not be considered to be problematic.

Further, the processed speech is searched for indications of the caller's request to speak to the supervisor (see block 45). Such requests may comprise using words or phrases such as "supervisor," "boss," "manager," and "person in charge." If the processed speech includes any of these stored words, then it is an indication that the caller is asking to speak to the supervisor. Thus, the call would be considered problematic and the supervisor would be notified.

In an alternative embodiment, the method may employ learning as a method of increasing the detection of problematic call interactions. The method recognizes and learns speech pattern regularities that appear over time. For example, a known customer may regularly use inappropriate language such as the use of the word "honey" to address the call center agent. The method may recognize this type of speech and learn that usage of speech of this type by this customer may not be problematic. The ability to predict speech may allow the problematic call system to be more efficient and increase the chances of accurately predicting problematic call interactions.

Figure 6:
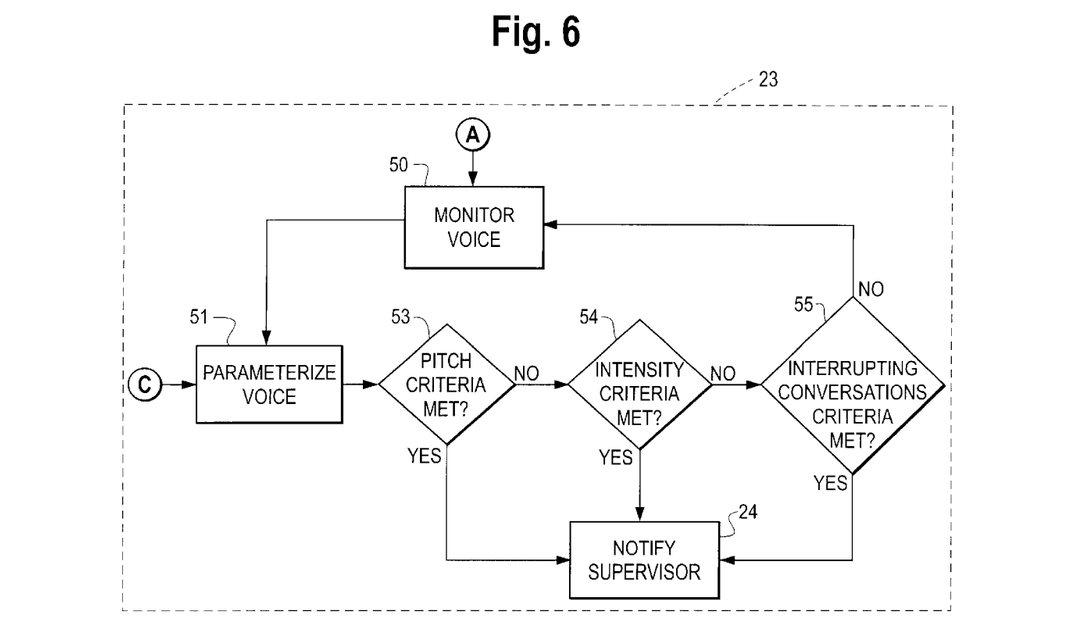
FIG. 6 is a simplified flow chart of the monitor voice block 23 of the problematic call detection method of FIG. 2.

Referring now to FIG. 6, monitoring continues by processing voice associated with the call. This includes parameterizing voice into attributes of pitch, and intensity (see block 51). As those skilled in the art will readily comprehend, monitoring of voice signals may be done in a number of well known manners, such as by estimating energy levels generated by the microphone of either party. Pitch and intensity may be measured by detecting energy levels of the call across a voice spectrum. Energy levels, in general, may be measured as an indication of an argument. Changes in pitch during a conversation may likewise indicate a developing dispute. Further, these voice attributes may be compared to the customer's profile to determine whether they are abnormal for the customer. If any of the conditions for a problematic call occur, then the call may be delivered to the supervisor (see block 14) or recorded for later review by the supervisor.

Further, monitoring may detect when frequent interruptions occur (see block 55) signifying a problematic call interaction. This may be done by comparing PCM samples from a forward voice channel (i.e. voice from the caller to the call center agent) with PCM samples from a reverse voice channel (i.e. voice from the call center agent to the caller). By comparing the temporal proximity of the PCM samples above a certain threshold level on the two channels, detection of interruptions can occur. If frequent interruptions occur, then the call may be delivered to the supervisor (see block 14) or recorded for later review by the supervisor.

At the end of a call interaction, certain calls may be copied to the database 8 for use at a future date. Further, a means for playing back the call may be provided. An embodiment of the invention allows the supervisor the ability to listen to all recorded calls or to select specific calls to listen to. In doing this, the call center supervisor may specify the recorded call interaction that he/she desires to play back. The supervisor may select only those calls where the voice volume exceeds a specified threshold. Alternatively, the supervisor may recognize and specify a normal pitch and word rate for an agent and select any conversation where the pitch or word rate exceeds a threshold. Further, the same criteria may be established for the other party to a conversation.

The method and system of this embodiment will then retrieve the recorded call interaction. Each recorded call may have an associated time stamp that describes when the recording started and the number of minutes of monitoring that were actually recorded.

Normally, recorded call playback is at the same speed as the actual conversation. Supervisors may, however, elect to speed up the playback by depressing a dial pad key or selecting menu items on terminal 14. Additionally, call center supervisors may elect to "jump back" or "skip ahead" or "skip over" the call completely.

Once a call center supervisor listens to a recorded monitoring session, the supervisor may elect to save or erase the recording. Supervisors may also voice annotate each monitored call by recording any number of messages that become inserted into the monitored call. These annotations may then be used when passing the recorded call to another supervisor or for commentary when the supervisor plays back the call during a coaching session with the call center agent. The supervisor may annotate each monitored call once or several times. Monitored sessions of the preferred embodiment may be digitized and compressed and then stored on disk.

A specific embodiment of a system and method of detecting problematic calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

What is claimed is:

1. A method of detecting problematic calls by a communication system, such method comprising the steps of:
   determining an identity of a caller based upon call associated information;
   retrieving a criteria for determining that the call is problematic based upon the determined identity of the caller;
   monitoring the call for problematic call attributes based upon the retrieved criteria; and
   notifying a supervisor when the call is determined to be problematic based upon said monitoring step.

2. The method of detecting problematic calls as in claim 1 wherein the step of monitoring calls further comprising using word recognition to detect inappropriate language.

3. The method of detecting problematic calls as in claim 2 wherein inappropriate language comprises profane and obscene language.

4. The method of detecting problematic calls as in claim 2 wherein the step of detecting inappropriate language further comprises comparing the inappropriate language to stored appropriate language.

5. The method of detecting problematic calls as in claim 1 wherein the step of monitoring calls further comprises using word recognition to detect a caller's request to speak to a supervisor.

6. The method of detecting problematic calls as in claim 5 wherein detecting a caller's request to speak to a supervisor further comprises recognizing words or phrases suggesting the supervisor.

7. The method of detecting problematic calls as in claim 6 wherein supervisor further includes one of a group including manager, boss, and "person in charge."

8. The method of detecting problematic calls as in claim 1 wherein the step of monitoring calls further comprising:
   measuring a stress level;
   comparing the measured stress level to a predetermined threshold; and
   determining the call to be problematic when the measured stress exceeds the predetermined threshold.

9. The method as in claim 8 wherein the predetermined threshold further comprises stored voice attributes.

10. The method of detecting problematic calls as in claim 1 wherein the step of monitoring calls further comprises ascertaining when interruptions occur frequently.

11. The method of detecting problematic calls as in claim 10 wherein the step of ascertaining interruptions further comprises detecting when a call center agent and caller are concomitantly talking.

12. The method of detecting problematic calls as in claim 10 wherein frequently comprises a stored number.

13. The method of detecting problematic calls as in claim 1 wherein detecting further comprises notifying a supervisor if the call is from a known problematic customer.

14. The method of detecting problematic calls as in claim 13 wherein the known problematic customer is determined by retrieving call associated information from a database of customer information which notes that a previous call interaction was problematic.

15. The method of detecting problematic calls as in claim 1 wherein the step of detecting further comprises identifying an abnormal call disconnection.

16. The method of detecting problematic calls as in claim 15 wherein abnormal further comprises detecting a long call duration and no sale.

17. The method of detecting problematic calls as in claim 16 wherein the detect ed long call duration further comprises comparing the call duration with a stored time value.

18. The method of detecting problematic calls as in claim 1 wherein the step of monitoring calls further comprises the steps of:
   automatically recording each call interaction to form a call file;
   creating a lookup table for the call file;
   retrieving a selected call interaction; and
   playing back the recorded call interaction.

19. The method of detecting problematic calls as in claim 18 wherein the call file further comprises a profile of recorded call interactions.

20. The method of detecting problematic calls as in claim 18 wherein a lookup table comprises call associated information of date, time, ANI, DNIS, customer name or call length.

21. The method of detecting problematic calls as in claim 18 wherein the step of playing back further comprises a user selecting a speed.

22. The method of detecting problematic calls as in claim 18 further comprising adding voice annotations to the played back call.

23. A system for detecting problematic calls by a communication system, such system comprising:
   means for determining an identity of a caller based upon call associated information;
   means for retrieving a criteria for determining that the call is problematic based upon the determined identity of the caller;
   means for monitoring the call for problematic call attributes based upon the retrieved criteria; and
   means for notifying a supervisor when the call is determined to be problematic based upon said attributes.

24. The system of detecting problematic calls as in claim 23 wherein the means for monitoring calls further comprises means for recognizing words to detect inappropriate language.

25. The system of detecting problematic calls as in claim 24 wherein inappropriate language comprises profane and obscene language.

26. The system of detecting problematic calls as in claim 24 wherein the means for recognizing words further comprises means for comparing the inappropriate language to stored appropriate language.

27. The system of detecting problematic calls as in claim 23 wherein the means for monitoring calls further comprises means for word recognition to detect a caller's request to speak to a supervisor.

28. The system of detecting problematic calls as in claim 27 wherein the means for word recognition recognizes words or phrases suggesting the supervisor.

29. The system of detecting problematic calls as in claim 27 wherein supervisor further includes one of a group including manager, boss, and "person in charge."

30. The system of detecting problematic calls as in claim 23 wherein the means for monitoring calls further comprises:
   means for measuring a stress level;
   means for comparing the measured stress level to a predetermined threshold; and
   means for determining the call to be problematic when the measured stress exceeds the predetermined threshold.

31. The system as in claim 30 wherein the predetermined threshold further comprises stored voice attributes.

32. The system of detecting problematic calls as in claim 23 wherein the means for monitoring calls further comprises means for ascertaining when interruptions occur frequently.

33. The system of detecting problematic calls as in claim 32 wherein the means for ascertaining when interruptions occur frequently further comprises means for detecting when a call center agent and caller are concomitantly talking.

34. The system of detecting problematic calls as in claim 32 wherein frequently comprises a stored number.

35. The system of detecting problematic calls as in claim 23 wherein detecting further comprises means for notifying a supervisor if the call is from a known problematic customer.

36. The system of detecting problematic calls as in claim 35 wherein the known problematic customer is determined by retrieving call associated information from a database of customer information which notes that a previous call interaction was problematic.

37. The system of detecting problematic calls as in claim 23 wherein the means for monitoring calls further comprises means for identifying an abnormal call disconnection.

38. The system of detecting problematic calls as in claim 37 wherein abnormal further comprises means for detecting a long call duration and no sale.

39. The system for detecting problematic calls as in claim 38 wherein the detected long call duration further comprises means for comparing the call duration with a stored time value.

40. The system of detecting problematic calls as in claim 23 wherein the means for monitoring calls further comprises:
   means for automatically recording each call interaction to form a call file;

means for creating a lookup table for the call file;

means for retrieving a selected call interaction; and means for playing back the recorded call interaction.

41. The system of detecting problematic calls as in claim 40 wherein the call file further comprises a profile of recorded call interactions.

42. The system of detecting problematic calls as in claim 40 wherein a lookup table comprises call associated information of date, time, ANI, DNIS, customer name or call length.

43. The system of detecting problematic calls as in claim 40 wherein the means for playing back further comprises means for a user selecting a speed.

44. The system of detecting problematic calls as in claim 40 further comprising means for adding voice annotations to the played back call.

45. A system of detecting problematic calls by a communication system, such system comprising:

a call connection monitor for monitoring for calls associated information;

a host for retrieving a monitoring profile for identifying problematic calls based upon the call associated information;

a call monitor which monitors the call for problematic attributes based upon the retrieved monitoring profile; and an informer that notifies a supervisor when the call is determined to be problematic.

46. A system of detecting problematic calls as in claim 45 wherein the call monitor comprises a programmable computer.

47. A system of detecting problematic calls as in claim 45 wherein the call monitor further comprises of a voice recognizer which detects inappropriate language.

48. A system of detecting problematic calls as in claim 47 wherein inappropriate language comprises profane and obscene language.

49. A system of detecting problematic calls as in claim 47 wherein the voice recognizer further comprises of an evaluator to compare the inappropriate language to stored appropriate language.

50. A system of detecting problematic calls as in claim 45 wherein the call monitor further comprises a voice recognizer which detects a caller's request to speak to a supervisor.

51. A system of detecting problematic calls as in claim 50 wherein the voice recognizer identifies words or phrases suggesting the supervisor.

52. A system of detecting problematic calls as in claim 51 wherein supervisor further includes one of a group including manager, boss, and "person in charge."

53. A system of detecting problematic calls as in claim 45 wherein the call monitor further comprises:

a stress measuring device which outputs the measured stress level;

a comparator with inputs of the measured stress level and a predetermined threshold; and a problematic call indicator which designates that the measured stress level exceeds the predetermined threshold.

54. A system of detecting problematic calls as in claim 53 wherein the predetermined threshold further comprises stored voice attributes.

55. A system of detecting problematic calls as in claim 45 wherein the call monitor further comprises an interruption detector.

56. A system of detecting problematic calls as in claim 55 wherein the interruption detector determines when a call center agent and caller are concomitantly talking.

57. A system of detecting problematic calls as in claim 55 wherein the interruption detector further comprises an evaluator which compares the detected number of interruptions to a stored number.

58. A system of detecting problematic calls as in claim 45 wherein the informer comprises a notifier which alerts the supervisor if the call is from a known problematic customer.

59. A system of detecting problematic calls as in claim 58 wherein the known problematic customer is specified in a database of customer information which notes that the previous call interaction was problematic.

60. A system of detecting problematic calls as in claim 45 wherein the call monitor further comprises a call duration detector for identifying an abnormal call disconnection.

61. A system of detecting problematic calls as in claim 60 wherein abnormal further comprises detecting a long call duration and no sale.

62. A system of detecting problematic calls as in claim 61 wherein an evaluator compares the long call duration with a stored time value.

63. A system of detecting problematic calls as in claim 45 wherein the call monitor further comprises:

a recorder which logs each call interaction to a call file;

a lookup table for identifying the call interactions in the call file;

a retrieval system for selecting a call interaction; and a playback mechanism to listen to the selected call interaction.

64. A system of detecting problematic calls as in claim 63 wherein the call file further comprises a profile of recorded call interactions.

65. A system of detecting problematic calls as in claim 63 wherein the lookup table comprises call associated information of date, time, ANI, DNIS, customer name or call length.

66. A system of detecting problematic calls as in claim 63 wherein the playback mechanism further comprises at least one control for a user selecting a speed.

67. A system of detecting problematic calls as in claim 63 further comprising an annotation mechanism for adding voice remarks to the played back call.

* * * * *